Jan. 5, 1971     D. P. GREGORY     3,553,022
ELECTROCHEMICAL CELL
Filed Sept. 30, 1965
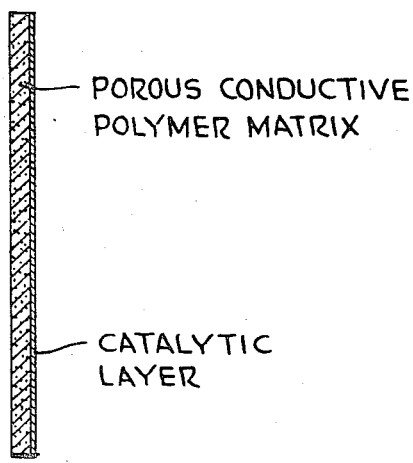
FIG. 1 — POROUS CONDUCTIVE POLYMER MATRIX / CATALYTIC LAYER
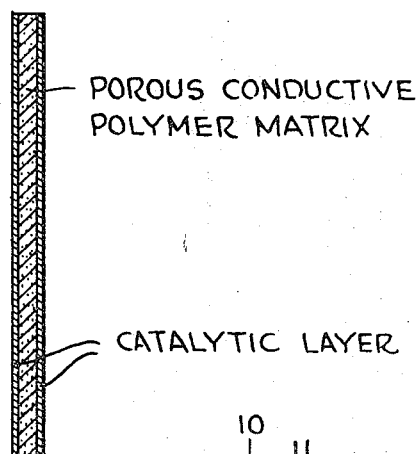
FIG. 2 — POROUS CONDUCTIVE POLYMER MATRIX / CATALYTIC LAYER
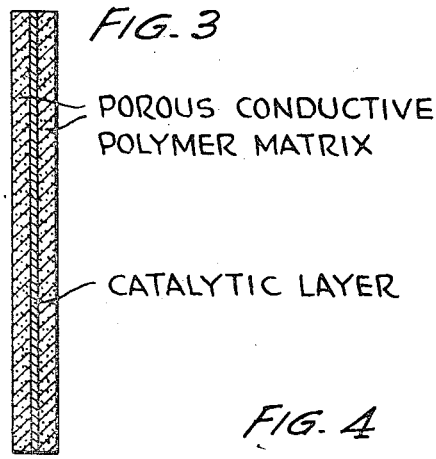
FIG. 3 — POROUS CONDUCTIVE POLYMER MATRIX / CATALYTIC LAYER
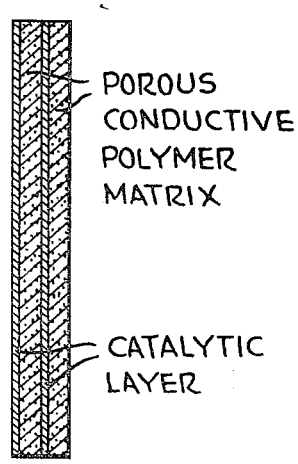
FIG. 4 — POROUS CONDUCTIVE POLYMER MATRIX / CATALYTIC LAYER
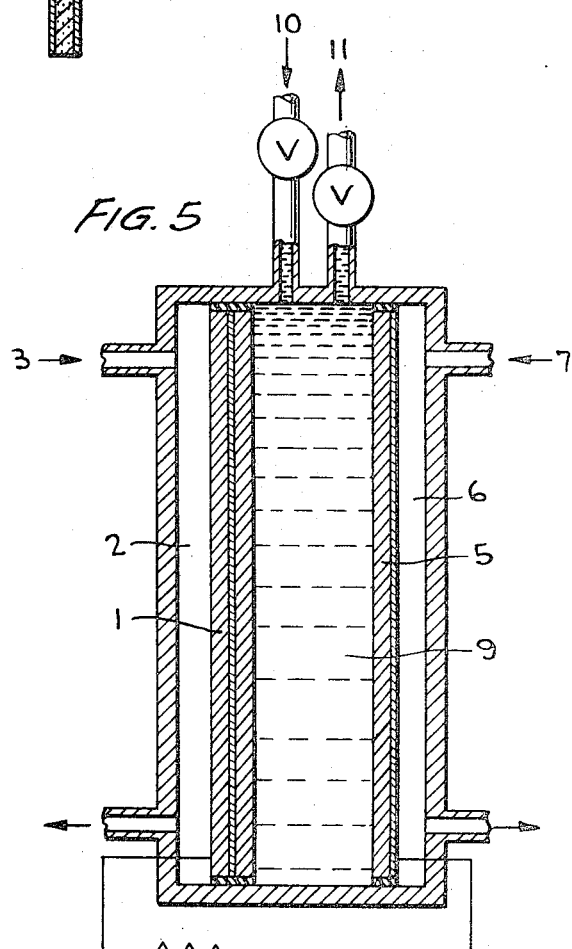
FIG. 5
INVENTOR,
DEREK P. GREGORY

United States Patent Office

3,553,022
Patented Jan. 5, 1971

3,553,022
ELECTROCHEMICAL CELL
Derek P. Gregory, Glastonbury, Conn., assignor, by mesne assignments, to Leesona Corporation, Cranston, R.I., a corporation of Massachusetts
Filed Sept. 30, 1965, Ser. No. 491,761
Int. Cl. H01m 27/00
U.S. Cl. 136—86          11 Claims

ABSTRACT OF THE DISCLOSURE

An improved lightweight electrode comprising an inert polymer in a major amount and a conductive material in a minor amount formed as a conductive matrix and having a catalytic layer on at least one surface of the conductive matrix and the disposition of the electrode in an electrochemical cell are described.

---

This invention relates to improved electrodes primarily for use in an electrochemical device such as a fuel cell and to the electrochemical device employing the novel electrodes. More particularly, the invention embraces a light weight electrode comprising a gas permeable inert material which has been rendered electronically conductive. For convenience hereinafter, the electrodes will be described with reference to a fuel cell. As will be apparent, however, similar considerations governing the use of the electrodes in fuel cells may apply to other electrochemical devices.

A fuel cell as the term is employed herein designates an electrochemical cell for the direct production of electrical current from a fuel and oxidant. The potential efficiencies of these cells is unlimited inasmuch as they are not governed by the Carnot heat cycle. Such cells, in their most simplified design, comprise a housing, an oxidizing electrode, a fuel electrode, and an electrolyte. In operation, it is necessary that the fuel and oxidant contact a surface of their respective electrodes where a process of adsorption and de-adsorption occurs, leaving the electrodes electrically charged with the second surface of the electrodes being in contact with the electrolyte. Depending upon the nature of the electrolyte, ions are transferred through the electrolyte from the anode to the cathode or from the cathode to the anode, or both. Electrical current is withdrawn from the cell and passed through a suitable load where work is accomplished. Although the electrolyte can be a solid, a molten paste or liquid, as a result of recent developments, emphasis has been placed on the use of liquid electrolytes, more specifically upon aqueous electrolyte solutions.

A critical problem encountered in the efficient operation of a fuel cell is in the control of the three-phase reaction interface of reactant, electrode, and electrolyte. In an effort to control the interface, Francis T. Bacon suggested the use of bi-porous metal electrodes. When such electrodes are used in a fuel cell, the metal surface having the large pores is in contact with the reactant gas; and the metal surface having the fine pores is in contact with the electrolyte. The reaction interface of the cell occurs substantially at the boundary of the coarse and fine pore layers.

Although the bi-porous electrodes provided a substantial improvement, it was found that these electrodes in order to avoid flooding and consequent blocking of the pores, as well as to provide sufficient structural integrity, were relatively thick increasing their resistance to gas flow. Moreover, in view of their method of manufacture, requiring carefully fractionated metal powders and numerous steps, the electrodes are expensive.

In an effort to avoid the aforesaid disadvantages, electrodes have been devised wherein an inert material such as a polymer layer is used in conjunction with a catalytic material to control the reaction interface of the electrode. The inert material acts as a structural support for the electrode and, additionally, controls the reaction interface. However, the material does not contribute to the electrode process of the fuel cell. Normally the catalytic layer is not highly conductive, therefore, in order to obtain effective electronic conductivity, it is necessary to coat the inert material with a film of conductive material such as gold, or to employ a conductive screen or mesh in the electrode. However, particularly when the polymer is employed on the fuel gas side, an inefficient operation is obtained. It is usually preferred that the current flows through the electrode perpendicular to the plane of the electrolyte. Where the inert substance is employed, however, it is necessary that the current be passed to the edges of the electrode, which is much less efficient.

It is a primary object of the present invention therefore to provide an inert material which is electronically conductive and is therefore eminently suitable in a fuel cell electrode.

It is another object of this invention to provide a fuel cell electrode comprising a hydrophobic surface for contacting the reactant gas with said hydrophobic surface being electronically conductive.

These and other objects of the invention will be more readily apparent from the following detailed description with particular emphasis being placed on the working example.

Briefly, the objects of the present invention are accomplished by constructing diffusion-type electrodes comprising inert polymers which have been rendered electrically conductive by incorporating a conductive material in the polymer. Specific illustrative structures of the invention include:

(1) A catalytic material applied to one side of a hydrophobic porous plastic which has been rendered electronically conductive. The electrode is used in a fuel cell with the catalytically active surface facing the electrolyte and the hydrophobic plastic surface facing the gas or liquid feed (fuel or oxidant);

(2) A hydrophobic and catalytic material applied to one side of a hydrophilic porous plastic which has been rendered electronically conductive. The electrode is employed in fuel cells with the catalytically active material in contact with a gas or liquid feed (fuel or oxidant) and the plastic in contact with an aqueous electrolyte;

(3) A catalytic material deposited onto both sides of a porous hydrophilic or hydrophobic plastic which has been rendered electronically conductive, with the catalytic material being the same or a different material. In the event the catalytic material is the same on both sides of the electronically conductive plastic, in operation in a fuel cell, the first layer will function to complete the major portion of the electrochemical reaction and the second surface will function as a scavenger-type electrode. In the event different catalysts are employed at the different surfaces, the catalyst in contact with the gas surface will preferably be primarily a reforming-type catalyst for converting a hydrocarbon to hydrogen and the second catalytic surface will preferably function primarily for electrochemically activating hydrogen. A cell employing the electrode will be fed with a carbonaceous fuel;

(4) A sandwich-type structure formed with the first layer of the structure being an electronically conductive hydrophobic polymer, the second layer being a catalytically activating material, and the third layer being a hydrophilic material such as a polymer or a metal. In operation, the hydrophobic conductive membrane will be in contact with the gas and the hydrophilic surface will be in contact with the electrolyte of the cell;

(5) A structure formed similiar to that described in 4 above with an additional layer of catalytic material being applied to the hydrophobic polymer.

In the drawing, FIGS. 1, 2, 3 and 4, illustrate cross sections of novel electrodes constructed in accordance with the present invention. FIG. 5 is a diagrammatical illustration of a fuel cell utilizing the novel electrodes of the invention.

More specifically, FIG. 1 illustrates an electrode structure with a porous conductive metal in intimate contact with a porous electronically conductive plastic matrix. In a fuel cell, the polymer membrane will preferably front the electrolyte of the cell if the polymer membrane is hydrophilic, whereas, in the event the polymer membrane is hydrophobic, it preferably will front the fuel reactant side, with the second major surface of the electrode being in contact with the electrolyte.

FIG. 2 illustrates a three-layer electrode with the first and third layers of the electrode being a porous conductive catalytically activating material with the intermediate layer being a porous electronically conductive matrix.

FIG. 3 is a sandwich-type structure wherein a conductive catalytic metal is sandwiched between a porous electronically conductive hydrophilic plastic or metal matrix and an electronically conductive hydrophobic matrix. When utilized in a fuel cell, the hydrophobic matrix will be in contact with the fuel gas and the hydrophilic matrix will be in contact with the electrolyte.

FIG. 4 is a structure similar to that shown in FIG. 3 with the electronically conductive hydrophobic membrane having an additional layer of catalytically activating material on its surface with said surface being in contact with the gaseous reactant when employed in a fuel cell.

FIG. 5 illustrates the use of the novel electrodes of the invention in a fuel cell. Thus, electrode 1 is a sandwich-type structure illustrated in FIG. 3 with fuel being passed into compartment 2 through inlet 3 with gaseous impurities being vented through outlet 4. The oxidizing electrode 5 comprises a structure as shown in FIG. 1 with a hydrophilic plastic matrix being in contact with the electrolyte and a catalytic material in contact with the reactant feed which is fed into compartment 6 through inlet 7 with impurities vented through outlet 8. Electrolyte 9, for example, a 28 percent aqueous potassium hydroxide electrolyte, is contained bewteen electrodes 1 and 5 and serves as an ion conductive medium. The electrolyte can be circulated by suitable means through electrolyte inlet and outlet 10 and 11. Electrical current is removed from the electrodes through external circuit M.

As is apparent from the above description, an electrode structure of the present invention can be tailored for virtually any fuel cell system in order to meet the requirements of any particular electrolyte or fuel. The fact that the inert material is electronically conductive greatly enhances the electrochemical performance of the cell. Moreover, it appears that the electronically conductive inert membranes of the present invention possess greater mechanical integrity than the membranes known in the prior art.

The electronically conductive matrices of the present invention comprise a polymeric material containing a conductive substance such as particles or fibers of metal, semi-conducting oxides or carbon, or the like, incorporated in a plastic. Suitable plastics include hydrophobic and hydrophilic materials such as polyvinylchloride, polyethylene, polytetrafluoroethylene, polystyrene, polymethylmethacrylate, polymethacrylate, polyacrylonitrile, and the like. However, inasmuch as the porous electronically conductive matrix is most eminently suitable for contact with the gaseous reactant, hydrophobic matrices such as polytetrafluoroethylene, polytrifluoroethylene, polytrifluorochloroethylene, polyvinylidenefluoride, and the like are preferred. The electronically conductive materials for rendering the matrix electronically conductive can be incorporated by various processes. Thus, finely divided polymer particles and metal particles can be dispersed in a suitable medium such as water or organic solvent, to form a homogeneous admixture with the water thereafter being drawn off through a filter or the like. The amount of conductive material which is employed in making the matrix will vary, depending upon the particular material employed. It is essential, however, that the conductive material be present in sufficient amounts in order that a continuous path of the metal—no matter how tortuous—exists from edge to edge of the matrix for removing the electrical current. Normally, the desideratum is to have as little of the conductive metal in the structure as possible in order to render the plastic conductive. Therefore, in the usual construction, the metal to polymer admixture will contain from about 1 to 50 percent conductive material and from 99 to 50 percent polymer on a weight basis. The optimum percentage is from about 5 to 15 percent metal and from about 95 to 85 percent polymer on a weight basis.

The thickness of the conductive matrix and the pore size thereof is not overly critical. It is necessary, however, that the matrix be permeable to the cell reactants, but yet prevents bubbling of the reactant into the electrolyte unconsumed. The minimum thickness is immaterial therefore so long as the electrode is structurally able to withstand the necessary pressure of the fuel cell reactant. On the other hand, the electrode should not be so thick as to have an unduly large internal resistance to mass flow. Therefore, a preferred range of thickness is from 0.0005 to 0.05 inch for the matrix with the optimum thickness being from 6.00 to 0.005 inch. The pore size of the matrix is preferably from 0.01 to 100 microns in diameter to establish the desired bubble pressure. The porosity should be as great as possible while maintaining the structural integrity of the matrix.

The catalyst which is to be employed with the electronically conductive matrix can be any material which is electrochemically active. Thus, the choice of catalytic metal will depend on a number of factors such as whether the electrode is to be used as the anode or cathode of the fuel cell and whether the fuel to be employed is hydrogen, a carbonaceous fuel, ammonia, or the like. Operable materials include the pure elements, alloys, oxides, or mixtures thereof, belonging to Groups I–B, II–B, IV, V, VI, VII, and VIII of the Mendelyeev's Periodic Table. Materials which have been found to be particularly advantageous include nickel, copper, tantalum, zinc, and the noble metals such as gold, silver, platinum, palladium, osmium, ruthenium, and the like. It has been found that the metal blacks of Group VIII of the Mendelyeev's Periodic Table are particularly advantageous when employed in uniform admixture with a hydrophobic polymer such as polytetrafluoroethylene or the like. These catalytic materials can be made by intimately admixing the components, for example, by dispersing them in an aqueous medium and thereafter withdrawing sufficient water to give the catalyst a doughlike mass. The doughlike mass is then spread or rolled onto the electronically conductive matrix. However, the structures can be prepared employing numerous other methods including chemically or electrochemically depositing a catalytic material upon the polymer substrate. The selection of the particular catalyst and its method of application to the electronically conductive plastic is within the ability of one skilled in the art.

The electrodes of the instant invention can be employed in fuel cells using virtually any of the prior art electrolytes. As is well known, for an efficient fuel cell it is necessary that the electrolyte remain invariant and have a high ionic conductivity. The alkaline electrolyte such as sodium hydroxide, potassium hydroxide, rubidium hydroxide and mixtures thereof, are particularly desirable. However, acid electrolytes such as sulfuric acid, phosphoric acid, etc., can be employed.

Additionally, the present electrodes can be employed as either the fuel electrode or cathode of the fuel cell. By judiciously selecting the activating metal of the catalitic layer, the electrodes of the present invention can be tailored to be particularly suitable for any specific fuel including hydrogen, carbon monoxide, methane, methanol, propane, and kerosene vapors. Additionally, metals such as silver and gold provide excellent properties in the electrode for use as the cathode operated on air as the oxidant. Moreover, the present electrodes can be utilized in fuel cell systems operated in a wide temperature range. One of the outstanding features of the present electrodes is their ability to provide reasonable current densities at a select voltage at low temperatures. Preferably, therefore, the present electrodes will be employed in fuel cells aperated at temperatures of from about 25 to 150° C. The cells can be operated, however, at temperatures as high as about 700° C., it being undestood that generally the higher the temperature the greater the electrochemical reaction. It is further understood, however, that at high temperatures, ancillary problems such as insulation of the cell and the like are increased.

Having described the invention in general terms, the following example is set forth to more particularly illustrate the invention. Parts are by weight unless otherwise specified.

EXAMPLE

A hydrophobic electronically conducted polymer layer was prepared by forming an aqueous dispersion of polytetrafluoroethylene and graphite. The dispersion contained 13 perecnt by weight graphite and 87 perecent by weight polytetrafluoroethylene. The dispersion was laid down on a ceramic filter plate and the water drawn off to provide a layer of hydrophobic polymer having the graphite uniformly dispersed therein. After the water was drawn off, the structure was heated at a temperature of 85° C. for 10 minutes, pressed, and thereafter heated at 250° C. for 20 minutes to bond at least the polytetrafluoroethylene particles. The conductive polymer layer is then coated on one surface with an aqueous mixture of platinum black and polytetrafluoroethylene. The mixture was composed of 30 weight percent polytetrafluoroethylene and 70 weight percent platinum. The electrode was vacuum dried and thereafter sintered at 275° C. for five minutes.

Electrodes as formed above were tested in a fuel cell as the anode and cathode. The anode was fed with pure hydrogen and the cathode fed with oxygen at a temperature of 60° C. and employing a 28 percent aqueous solution of potassium hydroxide as the electrolyte trapped in an asbestos matrix. The cell provided current densities as follows:

| Cell votage, mv.: | Current density ma./cm. |
|---|---|
| 500 | 675 |
| 600 | 425 |
| 700 | 225 |
| 800 | 90 |

As will be apparent to one skilled in the art, the illustrative example is set forth only as a preferred and working embodiment of the invention. The invention is not to be construed as limited thereby. It is possible to produce numerous embodiments within the format of the present disclosure without departing from the inventive concept and such embodiments are within the ability of one skilled in the art. Furthermore, as will be apparent to those skilled in the art, while the invention has been described with reference to fuel cells, it is possible to employ the aforesaid electrodes in other electrochemical devices.

What is claimed is:

1. An electrochemical cell for the direct production of electrical energy comprising an anode, a cathode, and an electrolyte separating said anode and cathode, at least one of said electrodes being non-consumable and comprising at least first and second distinct layers having different compositions, said first layer consisting essentially of an electrochemically inert polymer in a major amount and a relatively electrocatalytically inert conductive material in a minor amount to form a conductive layer, said second layer comprising a uniform admixture of a relatively electrocatalytically active material and a hydrophobic polymer.

2. The cell of claim 1 wherein said inert polymer is present at from 95 to 85 percent and said conductive material is present at from 5 to 15 percent on a weight basis.

3. The cell of claim 1 wherein the inert polymer is hydrophobic and the non-consumable electrode is positioned in the cell in order that said second or catalytic layer faces said electrolyte.

4. The cell of claim 1 wherein the inert polymer is hydrophilic and the non-consumable electrode is positioned in the cell in order that said first or conductive layer faces said electrolyte.

5. The cell of claim 1 wherein said non-consumable electrode includes a third layer and wherein said inert polymer in said first layer is hydrophobic and said third layer comprises an electrochemically inert hydrophilic material, and the electrode is positioned in the cell in order that the third layer faces said electrolyte.

6. The cell of claim 1 wherein the second layer comprises a homogeneous admixture of a catalyst black and polytetrafluoroethylene.

7. The cell of claim 2 wherein said inert polymer is polytetrafluoroethylene and the second layer comprises a homogeneous admixture of catalyst black and polytetrafluoroethylene.

8. The cell of claim 3 wherein the hydrophobic polymer is selected from the group consisting of polytetrafluoroethylene, polytrifluoroethylene, polytrifluorochloroethylene, and polyvinylidene fluoride.

9. The cell of claim 8 wherein the hydrophobic polymer is polytetrafluoroethylene.

10. The cell of claim 9 wherein the conductive material is carbon.

11. The cell of claim 9 wherein the second layer comprises a homogeneous admixture of catalyst black and polytetrafluoroethylene.

References Cited

UNITED STATES PATENTS

| 3,181,973 | 5/1965 | Duddy | 136—86 |
| 3,252,839 | 5/1966 | Langer et al. | 136—86 |
| 3,276,909 | 10/1966 | Moas | 136—86 |
| 3,328,204 | 6/1967 | Grubb | 136—86 |

WINSTON A. DOUGLAS, Primary Examiner

H. FEELEY, Assistant Examiner

U.S. Cl. X.R.

136—120